(12) United States Patent
Harris

(10) Patent No.: US 8,689,351 B1
(45) Date of Patent: Apr. 1, 2014

(54) PLAYING CONTROL FILES FOR PERSONAL VIDEO RECORDERS

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 21 days.

(21) Appl. No.: 13/450,905

(22) Filed: Apr. 19, 2012

Related U.S. Application Data

(63) Continuation of application No. 11/565,475, filed on Nov. 30, 2006, now abandoned.

(51) Int. Cl.
*G06F 21/00* (2013.01)

(52) U.S. Cl.
USPC ............ 726/27; 726/1; 726/2; 726/4; 726/17; 726/21; 726/28; 726/29; 726/30; 725/25; 725/31; 725/32; 725/34; 725/40; 725/41; 725/42; 725/56; 725/61; 725/86; 725/92; 725/88; 725/102; 725/142; 380/200; 380/203; 380/234

(58) Field of Classification Search
USPC .................... 726/1–21, 26–33; 380/200–208, 380/231–242; 725/22–43, 56–61, 86–105, 725/135–142
See application file for complete search history.

(56) References Cited

U.S. PATENT DOCUMENTS

| | | | |
|---|---|---|---|
| 6,963,858 B2 | 11/2005 | Wang et al. | |
| 7,171,558 B1 | 1/2007 | Mourad et al. | |
| 2001/0042043 A1 | 11/2001 | Shear et al. | |
| 2002/0174430 A1* | 11/2002 | Ellis et al. | 725/46 |
| 2003/0021412 A1 | 1/2003 | Candelore et al. | |
| 2003/0212824 A1 | 11/2003 | Yoshizawa et al. | |
| 2004/0028227 A1 | 2/2004 | Yu | |
| 2004/0172533 A1* | 9/2004 | DeMello et al. | 713/164 |
| 2005/0086532 A1 | 4/2005 | Lotspiech et al. | |
| 2005/0192902 A1 | 9/2005 | Williams | |
| 2005/0251690 A1 | 11/2005 | Kuno et al. | |
| 2006/0048224 A1 | 3/2006 | Duncan et al. | |
| 2007/0005504 A1* | 1/2007 | Chen et al. | 705/59 |
| 2007/0106682 A1 | 5/2007 | Frank | |
| 2008/0043775 A1* | 2/2008 | Fujinami et al. | 370/498 |

\* cited by examiner

*Primary Examiner* — Madhuri Herzog
(74) *Attorney, Agent, or Firm* — Law Office of Scott C. Harris, Inc.

(57) ABSTRACT

The certificate with specified conditions under which copyrighted material can be played. Copyrighted material, such as videos are stored in a storage unit. They are stored along with a policy that indicates when the information can be played. The information can, for example be encrypted one stored, and the decryption key is available only when characteristics of the policy are met. When those characteristics are not met, the information can not be retrieved at all or only can be retrieved in some very limited format.

13 Claims, 2 Drawing Sheets

PLAYING CONTROL FILES FOR PERSONAL VIDEO RECORDERS

CROSS-REFERENCE

This application is a Continuation of Ser. No. 11/565,475 filed Nov. 30, 2006. The disclosure of the parent application is incorporated herein by reference in its entirety.

BACKGROUND

Storing a video program for later watching has been a desirable goal of many systems. In the original days of video, the video stream could only be watched if the watcher were available at precisely the time the video stream was being broadcast. Different kinds of media for storing video such as video discs and the like, were eventually invented so that a user could watch video on demand. Videocassette recorders, or VCRs then allowed video to be recorded for time shifting purposes. Even though these devices allowed watchers to fast-forward over the commercials, the U.S. Supreme Court nonetheless found that recording this kind of information for later viewing was in fact "fair use" of the broadcaster's copyright.

Technology has made more sophisticated devices available. For example, the personal video recorder or digital video recorder, also known as the home theater PC or HTPC, allows video programming to be copied from a broadcast medium, and played back later. The programs are recorded digitally, and can be randomly selected during playback.

With the advent of digital television, the broadcasters and other copyright holders have become increasingly concerned that the personal video recorder can obtain a raw digital version of the transmitted program and use that raw digital information to circumvent the copyright. Different suggestions have emerged for dealing with the copyright issue, but most of these end up putting significant restrictions on the eventual viewing.

SUMMARY

The present application teaches different components that are usable with personal video recorders. One aspect teaches forming a portion of a recorded program that specifies management of the allowable ways to play the recorded program.

BRIEF DESCRIPTION OF THE DRAWINGS

These and other aspects will now be described with reference to the accompanying drawings, wherein.

DETAILED DESCRIPTION

Figure 1:
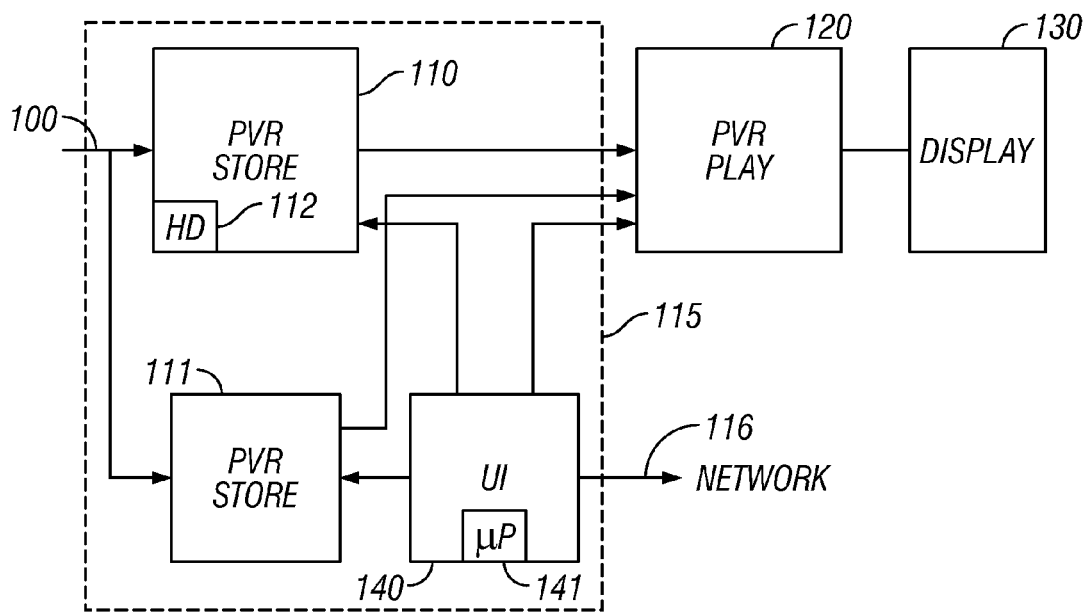
FIG. 1 shows a block diagram of the computer system.

A block diagram of the overall system is shown in FIG. 1. Content 100 is received into a personal video recorder 100 which can be any kind of computer-operated system that receives content, and stores it in some way in its associated storage and/or storage processes. The content may be any kind of multimedia, including video, audio, or other similar program material.

100 shows two PVR storage units 110 and 111, each of which may include a video tuner, control parts, as well as program guides that enable storing information. As well known in the art, there may be multiple different store modules, which enables the unit to record multiple different streams of information at the same time, for example recording from multiple different channels. The PVR storage units such as 110, 111 store the received information as digital information on a digital storage medium such as a hard drive 112. There may be one or many hard drives 112, either globally associated with individual PVR store units, or one individually associated with each PVR store unit.

120 shows the PVR playing module, which receives information from the PVR store module, and formats the stored information for eventual display on a television or other viewing screen shown as 130. The playing module 120 may be associated with or separate from the storage unit(s).

A user interface 140 enables interacting with the storing modules 110 and the playing module 120.

Figure 2:
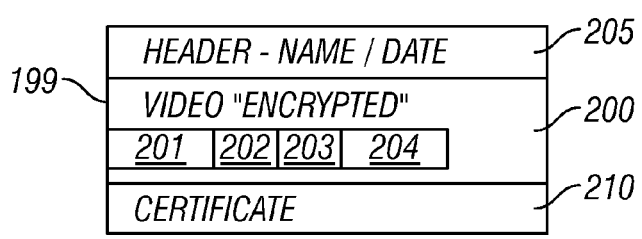
FIG. 2 shows a file system layout for a video.

In the embodiment, a hard drive stores a plurality of files which are managed by the file system. The files generally take the form shown in FIG. 2. The multimedia portion, here video portion 200 of the file 199 includes the video and audio content that was recorded from the program source.

In the embodiment, the video that is stored by the PVR storage unit is stored in an "encrypted" form. The word encrypted is used herein to represent any kind of change to the video stream that prevents the video stream from being directly viewed on a player without changing the video stream according to the code that was used to change the original video stream. The encrypted video used herein may be as simply encrypted as a bit shift. It may use a very simple encryption algorithm, such as the CSS algorithm that is used to encrypt the video that is stored on DVDs. It also may use a much more complex algorithm such as a public key algorithm or other.

The video 200 is also preferably compressed, with the compression typically being in MPEG-2 or MPEG-4 formats. Higher resolution information, such as high-definition information, may be more aggressively compressed.

The video file 199 also includes a header 205 which is typically unencrypted, and gives information about the video. For example, the header may have a file name and date, but it may also include the size, time length, and other information about the video obtained from the program guide information.

The video file 199 may also include a video certificate portion shown as 210. This is a special kind of video certificate, quite different than a conventional digital certificate. A digital certificate is an electronic file that includes name, a serial number, expiration dates, a copy of the certificate holder's public key (used for encrypting messages and digital signatures), and a digital signature of the certificate-issuing authority so that a recipient can verify that the certificate is real. Digital certificates may conform to the X.509 standard.

The video certificate 210 includes information that tells the player, of whatever form, "how" to decrypt the video, and the conditions under which the video can be decrypted. For example, the certificate may be in the form of an "if . . . then" statement. As an example, the conditions may be in the form of the statement "if (the video is being played on network FX) then, provide the key and allow decrypting with decryption key XY".

The certificate may itself use any kind of encryption technique to protect against surreptitious hacking. For example, the decryption code for the encrypted video 200 may itself be encrypted in a way that can only be received using some kind of secret code, or the like.

In any case, the video certificate 210 instructs how to decrypt the encrypted video, but has conditions which specify when the decryption key will be provided—e.g., only when decrypted video is being used in the way intended by the copyright holder.

The personal video recorder 100 may also store identifying information about the environment in which the program was recorded. It stores at the minimum information about the device 100 in which storage units 110, 111 are included. The environment may also include an identifier of the network 116 to which the storage unit is attached. The network may be the network over which program information is obtained, for example. The network identifier may include for example, Mac IDs of various devices attached to the network, or computer identifying indicia. It may be as simple as the network name or the owner name. Alternatively, it may be a detailed map of network characteristics.

The certificate 210 forms its conditional information the program owner's specifications. The owner specifications may be received as part of the program guide over the network 116, or may be embedded within the raw program data 99 that is eventually recorded. The conditions may specify when it is proper for the video 200 to be played back by a player such as 120, or any other player. Note that the player 120 may be included within the device 100, but may also be a separate player. For example, player 120 may be in a different PVR that is on the same network. It may be in a different PVR that is on a different network, for example when the user is trying to stream the video to their own player such as an iPod or other kind of personal player. The player 120 may also be a player that belongs to someone totally unrelated to the owner of the recorder 110.

The certificate indicates when it is okay for a player 120 of any of those types to play the encrypted video.

The certificate also includes information from which the decryption key can be obtained, either the key itself, part of the key, or an encrypted version of the key. Exemplary condition statements may allow certain kinds of players. For example, the certificate may say: "if the player is the same device that recorded the program, then playing is okay".

If the player is associated with a different TV on the same household (presumably connected to the same network or a network to which the device has wire connectivity) then playing is okay.

If the playing device 120 is owned by the same owner as the owner of the storage unit 110, then the unit may indicate that playing is ok.

Some owners may allow the program to be streamed to a personal recorder. If the unit 100 is sold, the system may specify that the new owner can also play the programs.

The owner may play the program on unit 100, or some other unit. The owner may be identified for example by a biometric scan for example a fingerprint or other biometric type scan, or by a pin, or by a smartcard, or proximity of a cell phone.

In addition, a completely open copyright policy may be in place for example the kind of copyright policy that might be associated with the movie trailer, or with a commercial or the like.

The policy can also require testing of the play kernel that must be carried out before playing by the kernel is enabled. This may check for a hacked play kernel, for example.

Also, when monitoring networks, it should be understood that the devices associated with the network may change over time when computers are turned on and off, and different devices are changed. The network may be established as being the same network when 40% of the nodes on the network agree or some other percent less than 100%. When some percentage of the networks agree, the device may conclude that the networks are the same.

According to an embodiment, some, but not all, of the video is encrypted. The video 200 can be considered as being made up of a number of bit parts shown as 201, 202, 203, and 204. Each of these video parts may be considered a frame. In the context of a compressed video sequence, there may be some frames that are more important than others. These more important frames are often called "keyframes" that is frames where the video scene is either completely reconstructed, or where a substantial portion of the video is reconstructed. The keyframes may be at random areas in the video, or may be determined to occur whenever necessary. According to the present system, the only a portion of the video is encrypted. For example, one frame every second may be encrypted, or all the keyframes may be encrypted, or one out of every 10 keyframes may be encrypted. This sufficiently distorts the video so that it can be watched in some form, but will not look distorted. An advantage of this system, however, is that it uses fewer resources are necessary for decrypting video frames. This means that stronger encryption can be used, making it more difficult to thwart the encryption of the file in the video portion 200. Moreover, in this way, encrypted portions of the recorded portion are interspersed between unencrypted portions of the recorded portion.

In one embodiment, the video may be encrypted using a combination of different encryption techniques, but only certain frames need to be decrypted in order to play.

Figure 3:
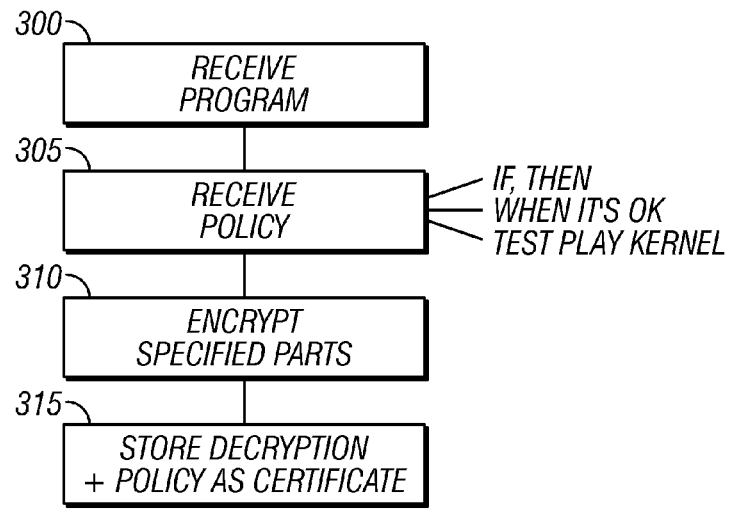
FIG. 3 shows a flowchart of the operation of forming a policy.
Figure 4:
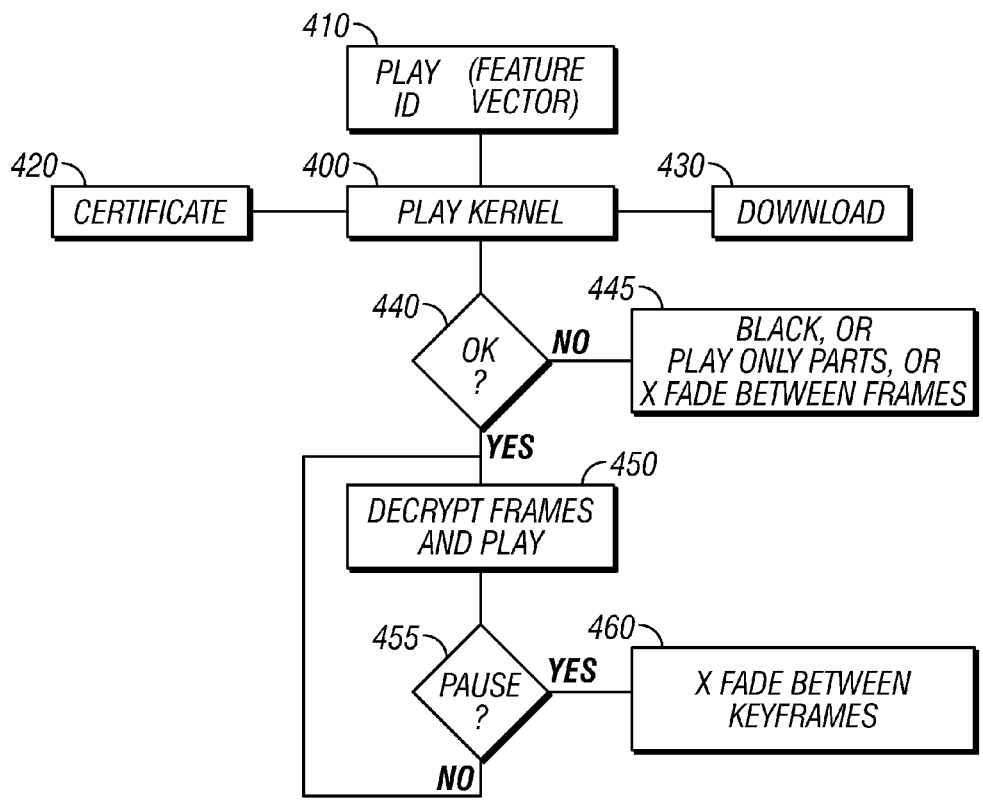
FIG. 4 shows a flowchart of playing a file.

FIGS. 3 and 4 illustrates a flowchart of operation. FIG. 3 illustrates recording a file, which can be carried out in any of the multiple recording processes 110, 111, under control of the user interface 140. At 300, the program information is received. This can be received as over the air (OTA) programming, over cable, into a satellite, via Wimax or other network receiver, or in any other form. As part of receiving the program, the system must also obtain a policy. The record process 110 preferably operates such that it can not record any program without an associated policy. The policy can be received over the network as part of the program guide information, or can be received as part of the program itself. The policy can be in the form of "if, then" statements as described above, or other form.

At 310, an encryption key is generated, and specified parts of the original program are encrypted according to the encryption key. The encryption key may be randomly generated, or may be generated based on characteristics received as part of the policy, or may be encoded based on a public key that is associated with the storage unit 110. It may use a random seed or any other well-known encryption forms. Since in the preferred mode, only a part of the video is encrypted, the encryption may be extremely strong, since it can use significant computing resources. According to another mode, the entire video may be encrypted, using for example, a dedicated processor or process, e.g., using a processor 141.

At 315, the information is stored as an encrypted file along with decryption information plus the policy. The decryption information plus policy is formed as a certificate that is associated with the encrypted video information. The decryption key plus policy forms information that must be used in order to decrypt the video.

According to another embodiment, only specified parts or layers of the video are encrypted, such that a reduced resolution or reduced quality version of the video can be played out without the decryption key. This may allow playing black and white or NTSC resolution without the decryption key.

A flowchart of the player operation is shown in FIG. 4. The play kernel 400 receives a number of different kinds of information including a play ID 410 which may be a feature vector that indicates the parameters of the environment in which the play kernel 400 resides. These parameters may be any of the parameters described above, including network name, network characteristics, owner name, hardware characteristics, or any other characteristics of the play kernel. The play ID may be for example a feature vector, where different aspects of the vector represent different characteristics of the player. The play kernel also receives the certificate 420 which is the certificate that is stored along with the encrypted video. As part of receiving the certificate, the certificate may have an applet or other kind of executable code that tests the play kernel to determine if the play kernel will actually execute the policy required by the certificate. For example, this may test to determine if the player has been hacked, or if the player is an unauthorized play kernel, one which has been separately written to attempt to bypass the policy within the certificate. Failure to pass the test in the certificate may result in failure to play the characteristics.

Updates may also be downloaded at 430. For example, the certificate may require updated security from the play kernel. A secure download certificate at 430 may be carried out.

Another aspect may require Internet verification every specified amount of time, for example once a week. The Internet verification may be for example via wireless, via wireless telephone, via Wimax, or via wireless network. Each specified amount of time, a test is run over the Internet to determine if the play kernel actually is executing specified policies. If the play kernel does not execute the specified policies, then the certificate is deactivated. Otherwise, the certificate is activated for a specified amount of time after which the certificate needs to be reactivated.

In this way, a play kernel can be used when the user is on a plane or somewhere where they cannot obtain Internet access. However, after a specified amount of time to player must be reactivated.

When all of the characteristics of the play car are found to be okay at 440, the video may then be decrypted at 450 and played using the decryption information contained within the certificate. If any parts of the test fail, then control passes to 445 which carries out a process according to the failure mode. One process may simply show a black screen or an error screen with an indication that the certificate has failed. Another part of the process may play a reduced quality video, for example only parts of the video, only those parts of the video that are unencrypted, or may play a cross fade between different frames within the video. In this way, the user can view some parts about the video, but not all of it.

Conventional PVRs enable a pause function, and one problem is that the paused frame may stay on the screen forever. A screen saver function may enable blanking the screen after a certain amount of time. However, this may lead to the problem that the user does not know that the TV is on.

In this embodiment, a screen saver function is carried out which enables cross fading between keyframes in a loop at 460. For example, keyframes for 10 or 20 seconds preceding the pause time, or keyframes requiring a specified amount of change between the pause time and some other amount of time, may be collected. A cross fade between the keyframes may be carried out at 460, or a slide show between the keyframes may be carried out at 460. This enables what is in effect a screen saving function so that the display screen is not harmed by the continuous frame.

One aspect involves determining the owner of the hardware that owns the playing hardware. For example, therefore, a user can own portable players such as an iPod, and can peer-network to their PVR at home, and download the copyrighted material for them to play later on the iPod. Assuming this policy is enabled by the certificate—then this same copyrighted material cannot be played on someone else's player. However, it can be played on the same owner's player. This in effect allows an owner to peer-network to their portable devices, or to their laptops and to be played thereon. However, it prevents that same information from being peer-networked to someone else's iPod or player.

The above has described storage of video, but the same techniques can be used for storing and retrieving other information, such as music. For example, only parts of the music may be encrypted, only specified parts of the music may be played when the policy is not met, or the music may be played at a significantly reduced resolution.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other forms of media can be recorded and handled in this way.

Also, the inventor intends that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned.

What is claimed is:

1. A system, comprising:
   a storage device that stores video information for playing, including multiple different programs;
   a playing part that receives commands over a user interface, and plays a specific program from among said different programs in response to a command from a user to play said specific program;
   said playing part enabling playing said specific program and also enabling pausing said specific program in response to a pause command from the user; and
   responsive to said pausing, said playing part finding multiple frames, said multiple frames being only certain frames of said specific program prior to said pausing and less than the entire program, and said playing part displaying an animation between said multiple frames during said pausing, said animation between said multiple frames using only said multiple frames of said specific program.

2. The system as in claim 1, wherein said multiple frames of said specific program are keyframes within a compressed format in which the specific program is stored.

3. The system as in claim 1, wherein said multiple frames are frames within only a specified time within said program prior to a time of said pausing, where said specified time is less than the entirety of said specific program that is prior to said pausing.

4. The system as in claim 3, wherein said specified time is a number of seconds.

5. The system as in claim 1, wherein said animation comprises a cross fade between said multiple frames.

6. The system as in claim 1, wherein said animation comprises a slideshow between said multiple frames.

7. The system as in claim 1, where said storage device stores a file that includes information indicative of conditions under which the specific program is to be played, and further stores a decryption key for said specific program, said decryption key to be used only if said conditions are met, where a first condition allows said decryption key to be used if the user of a player including said playing part is the same as an owner of a first recorder on which the specific program was recorded even if the player is not the same as the first recorder; and where a second condition allows said decryption key to be used if the player including said playing part is the same device as the first recorder on which the specific program was recorded even if the user of the of the player including said playing part is not the same as the owner of the player including said playing part and where both said first and second conditions allow said decryption key to be used for decrypting said specific program, and where said system also includes a networking part that allows transferring the specific program along with said file that includes said conditions to another device.

8. A system, comprising:

a storage device that stores multiple different programs for playing;

a playing part that receives commands over a user interface, and plays a specific program from among said multiple different programs by providing a video output indicative of playing of said specific program in response to a command from a user to play said specific program;

said playing part also enabling pausing said specific program in response to a command from the user to pause said specific program; and responsive to said command to pause said specific program, said playing part finding multiple frames, said multiple frames being only certain frames of said specific program that are only within a specified time within said program prior to a time of said pausing, where said specified time is less than an entirety of said specific program that is prior to said pausing, and responsive to said command to pause said specific program, said playing part displaying an animation between said multiple frames during said pausing, said animation between said multiple frames using only said multiple frames of said specific program.

9. The system as in claim 8, wherein said multiple frames of said specific program are keyframes within a compressed format in which the specific program is stored.

10. The system as in claim 8, wherein said specified time is a number of seconds.

11. The system as in claim 8, wherein said animation comprises a cross fade between said multiple frames.

12. The system as in claim 8, wherein said animation comprises a slideshow between said multiple frames.

13. The system as in claim 8, where said storage device stores a file that includes information indicative of conditions under which the specific program is to be played, and further stores a decryption key for said specific program, said decryption key to be used only if said conditions are met, where a first condition allows said decryption key to be used if the user of a player including said playing part is the same as an owner of a first recorder on which the specific program was recorded even if the player is not the same as the first recorder; and where a second condition allows said decryption key to be used if the player including said playing part is the same device as the first recorder on which the specific program was recorded even if a user of the of the player including said playing part is not the same as the owner of the player including said playing part and where both said first and second conditions allow said decryption key to be used for decrypting said specific program, and where said system also includes a networking part that allows transferring the specific program along with said file that includes said conditions to another device.

* * * * *